Feb. 12, 1952    R. V. WERNER    2,585,710
ELECTRIC MOTOR CONTROL SYSTEM
Filed Sept. 29, 1945
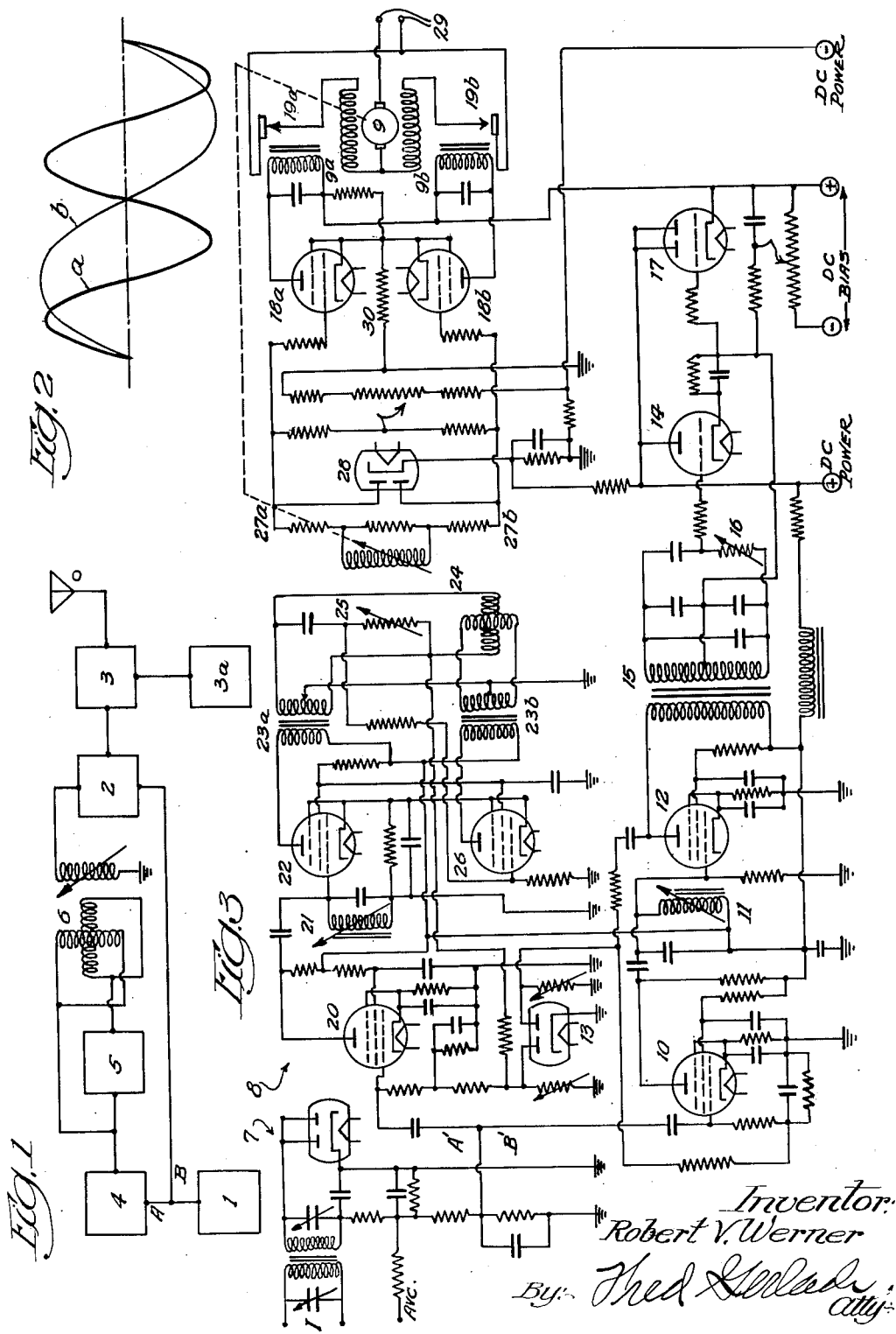
Inventor:
Robert V. Werner Patented Feb. 12, 1952

2,585,710

UNITED STATES PATENT OFFICE 2,585,710

ELECTRIC MOTOR CONTROL SYSTEM

Robert V. Werner, San Diego, Calif., assignor to Consolidated Vultee Aircraft Corporation, San Diego, Calif., a corporation of Delaware Application September 29, 1945, Serial No. 619,299

3 Claims. (Cl. 318—30)

The present invention relates in general to remote control and has more particular reference to means for accurately controlling a rotatable motor from a remote station.

An important object of the invention is to control a motor by operating the same in response to phase displaced alternating current electrical control impulses; a further object being to utilize such phase displaced impulses to control the delivery of driving power to the motor.

Another important object is to control the motor by means of control impulses embodying unlike frequencies and having selected phase displaced relationship.

Another important object is to provide for the radio transmission of phase displaced motor controlling impulses from a control station to the remotely located motor to be controlled.

Another important object is to provide for controlling the direction and degree of rotation of a motor by controlling the phase relationship of alternating motor control waves.

Another important object is to control the number of revolutions of a motor in a desired direction as a function of the phase displacement of motor control waves.

Another important object is to provide practical means for obtaining accurate control of remotely located mechanism, such as apparatus for the control of aircraft or other apparatus which, in accordance with the teachings of the present invention, may be controlled from a remotely located station over distances limited only by the range of the radio receiving and transmitting equipment employed.

The foregoing and other important objects, advantages and inherent functions of the invention will become apparent as the same is more fully understood from the foregoing description, which, taken in connection with the accompanying drawings, discloses a preferred embodiment of the invention.

Referring to the drawings:

Fig. 1 is a schematic representation of phase shifting and impulse wave transmitting apparatus adapted for location at a remote control station;

Fig. 2 is a graphical representation of phase displaced alternating current electrical impulses of unlike frequency that may be employed in the operation of the present control system, and Fig. 3 is a diagrammatic representation of electronic equipment for controlling a motor in accordance with the present invention.

The present invention, of course, is not necessarily limited to the radio transmission of motor controlling impulses, and control may be accomplished, if desired, by wire transmission between the remote control station and the device to be controlled. The invention, however, is particularly well adapted for the radio transmission of control impulses between a radio transmitter, at the remote control station, and a receiver including apparatus for the application of the transmitted impulses to the controlled motor.

To this end, the drawings show, in Fig. 1, impulse generating and transmitting means adapted to generate and adjustably shift the relative phase relationship of a pair of alternating electrical impulses preferably of unlike frequency. Both frequencies are transmitted to and impressed on receiving and motor control apparatus, shown in Fig. 3. The ultimate response of the motor is to revolve in one direction or the other, depending upon the direction of relative phase displacement of the controlling impulses. The number of revolutions made by the motor, in either direction, depends upon the degree of phase displacement of the impulses. The motor will continue to turn in the direction determined by the direction of phase displacement until it has compensated for the degree of phase displacement, at which instant the motor will cease to rotate, and may hunt back and forth in compensating position, hereinafter more fully explained. The motor may be returned to its original or starting position by reversing the phase displacement of the controlling electrical impulses, the motor again ceasing rotation when it has turned sufficiently to compensate for the degree of phase displacement of the controlling impulses. The impulse generating and phase displacing apparatus may comprise an oscillator 1 adapted to produce a desired fundamental frequency, preferably of the order of say 200 cycles.

As shown in Fig. 1, the oscillator may be connected, as through line B, to a modulator 2. This modulator may be connected to a radio frequency amplifier 3, which transmits the fundamental frequency as a modulation of a carrier frequency transmitting wave supplied from a suitable radio frequency oscillator 3a, connected with the transmitter.

The oscillator 1 may also be connected, as through the line A, to a frequency multiplier and phase corrector 4, which may be adjusted to multiply the fundamental frequency to any desired harmonic frequency, as for example, a harmonic frequency of 400 cycles. The multiplier 4 is connected through a 90 degree phase shifter 5 to one of the stator coils of a phase rotating transformer 6, the multiplier 4 being directly connected with another stator coil of the phase shifter. The adjustable coil of the phase shifter is connected to the modulator 2, which thus transmits not only the fundamental frequency, applied thereto over the line B, but also transmits the harmonic frequency, applied thereto through the phase shifting means, so that the harmonic is displaced in phase with respect to the fundamental wave by an amount determined by adjustment of the device 6 at the remote control station.

As indicated in Fig. 2 of the drawings, the signal transmitted from the amplifier 3 may comprise a carrier frequency modulated by an impulse "b," having the fundamental frequency of the oscillator 1, and also modulated by an impulse "a," having the harmonic frequency delivered by the multiplier 4, the impulses "a" and "b" having a phase relationship determined by the adjustment of the phase shifting transformer 6. The combined impulses may then be transmitted either by line wire or over a radio antenna O representing output means for delivering the impulses "a" and "b" from the impulse generating, phase shifting and transmitting apparatus shown in Fig. 1.

The motor 9 to be controlled may have field windings 9a and 9b of opposite polarity. The motor is connected with suitable means for receiving and discriminating between the impulses delivered from the transmitter. Where the impulses are transmitted by radio, the receiving means, at the motor to be controlled, may comprise a detector receiver 7 adapted to receive the transmitted impulses at its input side I. The receiver embodies means for eliminating the carrier frequency and for delivering the impulse waves "a" and "b" to a phase discriminating apparatus 8 embodying conductors A' and B' connected to the output of the receiver detector 7. Through line B' the output, from the receiver detector 7, is transmitted to an amplifier 10, thence through a tuned filter circuit 11, which eliminates all but the fundamental frequency impulse "b." This fundamental frequency impulse may then be further amplified by a power amplifier 12, the output of which is preferably maintained at a constant level as by coupling its output voltage with a diode rectifier 13 and applying the rectified voltage to the grid of the amplifier 10. The output of the power amplifier 12 is also applied to the grid of a voltage amplifier 14 through an impedance matching transformer 15, the secondary winding of which is connected in a resonant circuit, including a phase shifting device 16, which may be adjusted for the purpose of correcting over-all circuit phase errors. The voltage amplifier 14, in turn, is connected to activate the grid of a cathode follower 17. The cathode follower is adapted to allow current flow therethrough during the positive half-cycle of the fundamental frequency impulse "b." To this end, the cathode follower may normally be held in non-conducting condition by applying thereto a D. C. biasing potential from a suitable source. During the positive half-cycle interval the voltage amplifier 14 is adapted to apply potential of sufficient intensity to the grid of the tube 17 to cause the same to become conductive between its anodes and cathode. The cathode follower is connected with a source of direct current power so that, when the grid of the cathode follower is activated, during the positive half-cycle of the fundamental frequency impulse "b," the follower tube 17 applies a positive potential to the plates of a pair of thyratron tubes 18a and 18b through the coils of a pair of relays 19a and 19b.

Output impulses from the receiver detector 7 are also applied on the line A' and are delivered to an amplifier 20 forming a part of the discriminator apparatus 8. The amplified impulses are delivered from the amplifier 20 through a tuned filter circuit 21, which eliminates all but the predetermined harmonic impulse "a." This impulse is then amplified by passage through a power amplifier 22, the anode or plate of which is connected with an impedance matching transformer 23a. The secondary winding of this transformer 23a is connected to energize one of the stator coils of a phase rotating transformer 24. The secondary winding of the transformer 23a is also connected with a phase shifter 25, which alters the phase of the harmonic impulse "a" by 90 degrees and applies such altered impulse to the grid of a power amplifier 26. The anode or plate of the amplifier 26 is connected to an impedance matching transformer 23b. The secondary winding of this transformer 23b is connected to the other stator coil of the phase rotating transformer 24. As a consequence, both stator coils of the phase rotating transformer 24 are supplied with alternating voltage impulses of the harmonic frequency "a" having equal amplitude but differing 90 degrees in phase relationship.

The inclusion of the phase rotating transformer 24 in the phase discriminator circuit permits the phase of the voltage impulses applied to the grids of the thyratrons 18a and 18b to be varied in reference to the phase of the harmonic impulse "a." This phase relationship may be varied from 0 to 180 degrees, leading or lagging, depending upon the adjusted position of the rotor of the phase rotating transformer 24. The opposite ends of this adjustable rotor element of the phase rotating transformer 24 are connected respectively, as by the conductors 27a and 27b, to the grids of the thyratron tubes 18a and 18b. Said grids are consequently energized by voltage impulses that are 180 degrees out of phase. Preferably a voltage limiting tube 28 is applied in circuit between the conductors 27a and 27b in order to limit the voltage supplied to the grids of the thyratrons. The grids of the thyratrons 18a and 18b may thus be activated to permit the passage of current therethrough, during the positive half-cycles of the impulse waves applied thereto, these waves being 180 degrees out of phase. As soon as the grid of either thyratron is thus activated, current will flow therethrough and through the winding of the associated relay 19a or 19b, as the case may be. Each relay comprises a switch which is connected to a corresponding motor winding 9a or 9b. Actuation of a relay by its connected thyratron will thus connect the corresponding motor winding with a suitable source of motor driving power (not shown) through the connecting conductors 29, thereby causing the motor to turn in one direction or the other, depending upon which of the relays 19a or 19b is in operation.

As soon as either thyratron thus goes into operation, ionization of the gaseous contents thereof robs the grid of control. Consequently, the thyratron will continue to operate, free of grid control, until its plate voltage is removed. This occurs when the grid of the cathode follower 17 is not made positive, by the amplifier 14, during a positive half-cycle of the fundamental frequency impulse "b."

So long as the cathode follower 17 supplies plate voltage to the thyratrons, the thyratron which will be first to fire will be the one which is receiving a positive half-cycle exciting impulse on its grid at the instant of application of plate voltage thereto by the cathode follower. The thyratrons are so connected that when one of them fires, the resulting current drain produces a positive voltage drop across a biasing resistance 30, which is common to the cathodes of both thyratrons. As a consequence, the cathode of the tube which has not fired becomes positive to the extent of the voltage drop across the biasing resistance 30, thus effectively increasing the negative potential of the grid of such thyratron with respect to its cathode that it cannot fire while the other thyratron is in operation. In this connection, the voltage limiting tube 28 restricts the voltage applied to the grids of the thyratrons to such a degree that grid excitation cannot overcome the bias imposed by the resistance 30 upon the tube that has not fired. It is, therefore, impossible for both thyratrons to be in operation simultaneously. The first of the thyratrons to fire thus will be the one which is receiving a positive half-cycle impulse delivered on its grid through the phase rotating transformer 24, and that thyratron will continue in operation until its plate current is cut off.

The factor determining which thyratron will operate is the exact phase relationship between the plate exciting impulse, delivered through the cathode follower 17, and the grid exciting impulse, delivered through the transformer means 24. It is thus apparent that changes in phase, accomplished by the phase changing transformer 24, will determine which of the two thyratrons will be placed in operation. Furthermore, it is apparent that passage of current through one of the thyratrons will determine the direction of rotation of the motor 9. The motor is mechanically connected with the phase rotating transformer 24, as by any suitable, preferably geared, transmission, the ratio of which may be the same as the ratio between the motor and any driven device connected therewith, whereby the phase control accomplished by the transformer 24 is related to the movement of the motor 9 and the ultimately controlled mechanism driven by the motor.

It will also be seen that any change in the phase of the fundamental frequency impulse "b" with respect to the harmonic frequency impulse "a" will be transmitted to the plates of the thyratrons through the cathode follower 17, and that the direction of such phase change, whether it be leading or lagging, will determine which of the thyratrons shall go into operation and control the direction of rotation of the motor 9. The movement of the motor, and of the ultimately controlled mechanism driven thereby, will continue only to the extent determined by the difference of the phase displacement set at the device 6 from the phase displacement accomplished by the device 24. It is to be understood that the transformers 24 and 6 are exact duplicates. Being duplicates and being operated in the same manner, the amount of phase change in one will occur in the same proportion in the other. Since the motor is drivingly connected with the phase rotating transformer 24, rotation of the motor will turn the transformer 24 in such a direction as to bring the voltage impulses, delivered through conductors 27a or 27b, into the same phase relationship with respect to the impulse wave, delivered through the cathode follower 17, as is set at the device 6, thereby setting up a state of balance. At such time the plate current will be removed from the thyratron in operation and transferred to the other thyratron, which transfer will tend to effect an unbalance in the motor control circuit. However, when unbalance does occur the plate current will immediately switch to the opposite thyratron to effect a movement of the motor in the opposite direction. Thus the motor does not come to a complete halt; rather, there is provided an oscillatory movement about a neutral point. This movement is very small, being no more than about two mechanical degrees, and does not affect the result being sought by the present invention. If in the use of the invention it is required that the motor come to a complete stop, an anti-hunt means of any well-known construction could be provided to remedy this oscillation.

The rotation of the rotor of the transformer 6, at the transmitting station through a given number of degrees, will result in the rotation of the transformer 24 in a corresponding direction and through the same displacement. Rotation of the motor 9 may be utilized to bring about rotary motion or converted linear motion, or both, in the connected apparatus driven by the motor. The degree of such rotary or linear motion will be in proportion to the phase shift applied in the remote control apparatus, and the gear ratio between the motor and the controlled mechanism.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Apparatus for controlling the operation of an electric motor comprising a pair of gaseous conduction valves each having a control grid and a plate and connected respectively to control the operation of the motor in opposite directions, means to deliver plate power to said valves in response to a control impulse wave of selected frequency and continuous phase rotating means drivingly connected with said motor, for delivering grid control waves of a selected frequency different from the frequency of said impulse wave, on the grids of said valves, in phase displacement with respect to said impulse wave and in phase opposition the one with respect to the other, to thereby actuate the motor in one direction or the other in accordance with the relative phase displacement of the impulse and grid control waves and to halt rotation of the motor in such direction after it has turned the phase rotating means sufficiently to alter the phase displacement of the control waves to a selected degree.

2. Apparatus for controlling the operation of an electric motor comprising a pair of gaseous conduction valves each having a control grid and a plate and connected respectively to control the operation of the motor in opposite directions, means to deliver plate power to said valves in response to a plate control impulse wave of selected frequency and means including phase rotating means energized by a grid control impulse wave of selected frequency different from the frequency of said plate control impulse wave and in phase displacement therewith, said phase rotating means being drivingly connected with said motor, for delivering grid control waves of frequency different from that of said plate control impulse wave, on the grids of said valves, in phase displacement with respect to said plate control impulse wave and in phase opposition the one with respect to the other, including means at a remote station for transmitting said phase displaced plate and grid control impulse waves, receiver means for segregating said plate and grid control impulse waves and applying one to the control of plate power to said valves and the other to said phase rotating means for the activation of said grids, to thereby actuate the motor in one direction or the other in accordance with the relative phase displacement of the plate control impulse and grid control waves, and to halt rotation of the motor in such direction after it has turned the phase rotating means sufficiently to equalize the phase displacement of the plate control impulse and grid control waves with the phase displacement of the control waves as selected at the remote control station.

3. Apparatus for controlling the operation of an electric motor comprising a pair of gaseous conduction valves, each having a control grid and a plate and connected respectively to control the operation of the motor in opposite directions, means at a remote control station for generating and transmitting a pair of control impulse waves of unlike frequency and having selected phase displacement, means for receiving said waves and for discriminating the same, means to apply one of said waves as a power control wave to control the delivery of plate power on said valves, linear continuous phase rotating means drivingly connected with said motor and energized in response to the other of said impulse waves for delivering grid control waves having a frequency different from that of said power control wave, on the grids of said valves, in phase displacement with respect to said power control wave and in phase opposition the one with respect to the other, to thereby actuate the motor in one direction or the other in accordance with the relative phase displacement of the power control and grid control waves and to halt rotation of the motor in such direction after it has turned the phase rotating means sufficiently to alter the phase displacement of the control waves to a selected degree.

ROBERT V. WERNER.

REFERENCES CITED

The following references are of record in the file of this patent:

UNITED STATES PATENTS

| Number | Name | Date |
|---|---|---|
| 2,183,725 | Seeley | Dec. 19, 1939 |
| 2,256,482 | Isbister et al. | Sept. 23, 1941 |
| 2,256,487 | Moseley et al. | Sept. 23, 1941 |
| 2,287,002 | Moseley | June 16, 1942 |
| 2,295,960 | Moore | Sept. 15, 1942 |
| 2,356,922 | Eltgroth | Aug. 29, 1944 |
| 2,376,527 | Wills | May 22, 1945 |
| 2,399,695 | Satterlee | May 7, 1946 |
| 2,462,117 | Mikkelson et al. | Feb. 22, 1949 |